United States Patent
Duan et al.

(10) Patent No.: US 8,539,078 B2
(45) Date of Patent: Sep. 17, 2013

(54) ISOLATING RESOURCES BETWEEN TENANTS IN A SOFTWARE-AS-A-SERVICE SYSTEM USING THE ESTIMATED COSTS OF SERVICE REQUESTS

(75) Inventors: Ning Duan, Beijing (CN); Amol Ghoting, Pomona, NY (US); Ramesh Natarajan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/832,559

(22) Filed: Jul. 8, 2010

(65) Prior Publication Data

US 2012/0011518 A1    Jan. 12, 2012

(51) Int. Cl.
*G06F 7/04* (2006.01)
*G06F 15/173* (2006.01)
*G06F 15/177* (2006.01)

(52) U.S. Cl.
USPC ........... 709/226; 709/220; 709/223; 726/3

(58) Field of Classification Search
USPC .................. 709/226, 220, 223; 726/3
See application file for complete search history.

(56) References Cited

U.S. PATENT DOCUMENTS

| | | | |
|---|---|---|---|
| 6,086,618 A * | 7/2000 | Al-Hilali et al. | 703/2 |
| 6,717,950 B2 | 4/2004 | Lui et al. | |
| 6,816,898 B1 * | 11/2004 | Scarpelli et al. | 709/224 |
| 6,925,431 B1 * | 8/2005 | Papaefstathiou | 703/17 |
| 7,320,131 B1 * | 1/2008 | O'Toole, Jr. | 718/104 |
| 7,426,736 B2 * | 9/2008 | Cole et al. | 719/318 |
| 7,499,968 B1 * | 3/2009 | Alexander et al. | 709/203 |
| 7,552,208 B2 * | 6/2009 | Lubrecht et al. | 709/223 |
| 7,639,671 B2 * | 12/2009 | Zwernemann et al. | 370/352 |
| 7,676,569 B2 * | 3/2010 | Barnett et al. | 709/224 |
| 7,680,916 B2 * | 3/2010 | Barnett et al. | 709/223 |
| 7,779,127 B2 * | 8/2010 | Cherkasova et al. | 709/226 |
| 7,836,452 B2 * | 11/2010 | Taylor | 718/104 |
| 7,886,021 B2 * | 2/2011 | Scheifler et al. | 709/217 |
| 8,019,812 B2 * | 9/2011 | Janedittakarn et al. | 709/203 |
| 8,032,585 B2 * | 10/2011 | Cherkasova et al. | 709/203 |

(Continued)

FOREIGN PATENT DOCUMENTS

WO    WO 2006076520 A2 *    7/2006

OTHER PUBLICATIONS

Yu, J., et al., "Multivariate Stochastic Volatility Models: Bayesian Estimation and Model Comparison", Econometric Reviews, 2006, 25(2-3), pp. 361-384, Taylor & Francis Group.

(Continued)

*Primary Examiner* — Jerry Dennison
*Assistant Examiner* — Daniel C Murray
(74) *Attorney, Agent, or Firm* — Scully, Scott, Murphy & Presser, P.C.; Daniel P. Morris, Esq.

(57) ABSTRACT

An apparatus hosting a multi-tenant software-as-a-service (SaaS) system maximizes resource sharing capability of the SaaS system. The apparatus receives service requests from multiple users belonging to different tenants of the multi-tenant SaaS system. The apparatus partitions the resources in the SaaS system into different resource groups. Each resource group handles a category of the service requests. The apparatus estimates costs of the service requests of the users. The apparatus dispatches service requests to resource groups according to the estimated costs, whereby the resources are shared, among the users, without impacting each other.

22 Claims, 5 Drawing Sheets

(56) References Cited

U.S. PATENT DOCUMENTS

| | | | |
|---|---|---|---|
| 8,082,550 B2* | 12/2011 | O'Toole, Jr. | 718/104 |
| 8,099,487 B1* | 1/2012 | Smirnov et al. | 709/223 |
| 8,195,743 B2* | 6/2012 | Janedittakarn et al. | 709/203 |
| 8,266,254 B2* | 9/2012 | Garrison et al. | 709/220 |
| 8,271,643 B2* | 9/2012 | Barnett et al. | 709/224 |
| 8,276,161 B2* | 9/2012 | Cole et al. | 719/318 |
| 8,332,860 B1* | 12/2012 | Yahalom et al. | 718/104 |
| 8,359,223 B2* | 1/2013 | Chi et al. | 705/7.22 |
| 8,380,557 B2* | 2/2013 | Moon et al. | 705/7.28 |
| 8,385,351 B1* | 2/2013 | Chen et al. | 370/395.21 |
| 8,396,757 B2* | 3/2013 | Fellenstein et al. | 705/26.4 |
| 8,412,823 B1* | 4/2013 | Richardson et al. | 709/225 |
| 2002/0049608 A1* | 4/2002 | Hartsell et al. | 705/1 |
| 2002/0198961 A1* | 12/2002 | Krishnamurthy et al. | 709/217 |
| 2003/0046396 A1* | 3/2003 | Richter et al. | 709/226 |
| 2005/0256971 A1* | 11/2005 | Colrain et al. | 709/238 |
| 2006/0036756 A1* | 2/2006 | Driemeyer et al. | 709/231 |
| 2006/0167984 A1* | 7/2006 | Fellenstein et al. | 709/203 |
| 2006/0245564 A1* | 11/2006 | Li et al. | 379/114.02 |
| 2007/0043696 A1* | 2/2007 | Haas et al. | 707/2 |
| 2007/0106769 A1* | 5/2007 | Liu | 709/223 |
| 2007/0180085 A1* | 8/2007 | Barnett et al. | 709/223 |
| 2008/0021799 A1 | 1/2008 | Blowers | |
| 2008/0049786 A1 | 2/2008 | Ram et al. | |
| 2008/0239985 A1* | 10/2008 | Karve et al. | 370/254 |
| 2008/0270526 A1* | 10/2008 | Barnett et al. | 709/203 |
| 2009/0019137 A1* | 1/2009 | Mishra et al. | 709/220 |
| 2009/0019535 A1* | 1/2009 | Mishra et al. | 726/12 |
| 2009/0172561 A1* | 7/2009 | Driemeyer et al. | 715/744 |
| 2009/0288084 A1* | 11/2009 | Astete et al. | 718/1 |
| 2009/0327471 A1* | 12/2009 | Astete et al. | 709/223 |
| 2010/0005443 A1* | 1/2010 | Kwok et al. | 717/100 |
| 2010/0023937 A1* | 1/2010 | Kothari et al. | 717/170 |
| 2010/0049851 A1* | 2/2010 | Garrison et al. | 709/226 |
| 2010/0077449 A1* | 3/2010 | Kwok et al. | 726/3 |
| 2010/0106478 A1* | 4/2010 | Barnett et al. | 703/17 |
| 2010/0138830 A1* | 6/2010 | Astete et al. | 718/1 |
| 2010/0306377 A1* | 12/2010 | DeHaan et al. | 709/226 |
| 2011/0055398 A1* | 3/2011 | DeHaan et al. | 709/226 |
| 2011/0055817 A1* | 3/2011 | Noble et al. | 717/127 |
| 2011/0125895 A1* | 5/2011 | Anderson et al. | 709/224 |
| 2011/0138047 A1* | 6/2011 | Brown et al. | 709/226 |
| 2011/0138050 A1* | 6/2011 | Dawson et al. | 709/226 |
| 2011/0138051 A1* | 6/2011 | Dawson et al. | 709/226 |
| 2011/0145392 A1* | 6/2011 | Dawson et al. | 709/224 |
| 2011/0145413 A1* | 6/2011 | Dawson et al. | 709/226 |
| 2011/0225299 A1* | 9/2011 | Nathuji et al. | 709/226 |
| 2011/0258620 A1* | 10/2011 | Gao et al. | 717/178 |
| 2011/0270886 A1* | 11/2011 | An et al. | 707/785 |
| 2011/0271278 A1* | 11/2011 | Dittrich | 718/1 |
| 2011/0295999 A1* | 12/2011 | Ferris et al. | 709/224 |
| 2011/0296023 A1* | 12/2011 | Ferris et al. | 709/226 |
| 2011/0318011 A1* | 12/2011 | Brassil | 398/82 |
| 2011/0320606 A1* | 12/2011 | Madduri et al. | 709/226 |
| 2012/0047265 A1* | 2/2012 | Agarwala et al. | 709/226 |
| 2012/0066020 A1* | 3/2012 | Moon et al. | 705/7.28 |
| 2012/0096158 A1* | 4/2012 | Astete et al. | 709/225 |
| 2012/0102481 A1* | 4/2012 | Mani et al. | 717/172 |
| 2012/0110566 A1* | 5/2012 | Park | 717/174 |
| 2012/0151062 A1* | 6/2012 | Gusev et al. | 709/226 |
| 2012/0158453 A1* | 6/2012 | Chung et al. | 705/7.26 |
| 2012/0173581 A1* | 7/2012 | Hartig et al. | 707/781 |
| 2012/0179646 A1* | 7/2012 | Hinton et al. | 707/607 |
| 2012/0215918 A1* | 8/2012 | Vasters et al. | 709/226 |
| 2012/0323509 A1* | 12/2012 | Chen et al. | 702/60 |
| 2013/0042005 A1* | 2/2013 | Boss et al. | 709/226 |
| 2013/0080640 A1* | 3/2013 | Rai | 709/226 |
| 2013/0085742 A1* | 4/2013 | Barker et al. | 703/22 |

OTHER PUBLICATIONS

Myung, J., "Tutorial on maximum likelihood estimation", Journal of Mathematical Psychology, 2003, 47, pp. 90-100, Academic Press.

Murphy, K. P., "Linear regression", Mar. 2007, http://citeseerx.ist.psu.edu/viewdoc/download?doi=10.1.1.121.3661&rep=rep1&type=pdf.

Jordan, M. I., "Neural Networks", ACM Computing Surveys, Mar. 1996, vol. 28, No. 1, CRC Press.

* cited by examiner

|  | Number of Tenants | Number of Heavy-weight jobs | Number of concurrent normal jobs | Number of no-impact jobs | Resource cost |
| --- | --- | --- | --- | --- | --- |
| Trial System (550) | 20 | 4 | 60 | 100 | Every 100 ordinary jobs will cost 20% resource; every 1 heavy job will cost 10% resource; |
| Paid System (560) | 10 | 5 | 40 | 160 | |

ISOLATING RESOURCES BETWEEN TENANTS IN A SOFTWARE-AS-A-SERVICE SYSTEM USING THE ESTIMATED COSTS OF SERVICE REQUESTS

BACKGROUND

The present application generally relates to software-as-a-service (SaaS) system. More particularly, the present application relates to improving the resource sharing capability in a SaaS system under a constraint of performance isolation between individual tenants.

SaaS is a method for software deployment using the Internet. Under SaaS, a software provider licenses a software application to clients for use as a service on demand, e.g., through a time subscription. SaaS allows the provider to develop, host and operate a software application for use by clients, who just need a computer with internet access to download and run the software application and/or to access a host to run the software application. The software application can be licensed to a single user or a group of users, and each user may have many clients and/or client sessions.

Typically, SaaS systems are hosted in datacenters, whose infrastructure provides a set of resources and/or application services to a set of multiple tenants. A "tenant" here refers to a distinct set/group of customers/users with a service contract with the provider to support a specific IT workload. Therefore, each tenant comprises several individual users, each of whom requests his/her specific applications and/or sends service requests to the SaaS system.

Service Level Agreements (SLAs) are often used between a hosting SP (Service Provider) and hosted tenants, which specify desired performance levels to be delivered as well as the penalties to be imposed when these desired performance levels are not met. An SP can plan and allocate a resource capacity for each tenant to ensure that SLA requirements are fulfilled. This allocation may lead the SP to conservatively provision the resources in order to adequately cover tenant's peak-load requirements.

While the SP wants to maximize the sharing of the infrastructure resources in the SaaS environment, these resource-sharing arrangements can conflict with a need to ensure that each individual tenant has an availability and access to the required resources for fulfilling the tenant's SLA requirements. Therefore, while it is a priority for the SP to improve the resource sharing capability of the SaaS infrastructure, it is also important to isolate a performance impact due to the resource sharing on the individual tenants to ensure that a mutual performance impact due to the resource sharing in an SaaS environment is minimized and does not compromise the essential performance requirements (e.g., creating and/or storing on-line documents without any visible delay) of individual tenants.

Thus, when serving multiple tenants with their set of requirements in a SaaS environment, the SP needs to find a way to manage system and application resources in order to resolve this conflict between maximizing the resource sharing and minimizing the mutual performance impact. For example, some SPs may provide only a single shared resource pool for all the multiple tenants, and an operations management system is responsible for adjusting/allocating the resources in this resource pool so as to appropriately fulfill customer requests taking into account the SLA requirements and the availability and capacity of the system. However, this approach can lead to a conservative provisioning of the resources, particularly since anecdotal evidence suggests that the ratio of a peak load to an off-peak load for Internet-based SaaS applications can be of an order of 300%.

Furthermore, in a typical SaaS environment, due to variations in the number of requests and costs associated with each request, it may be difficult to estimate workload requirements in advance. Due to these variations, the worst-case resource capacity planning will invariably lead to requirements that are either unfeasible or inefficient. Although it is desirable to obtain an optimal dynamic resource allocation, this requires solving a difficult optimization problem and cannot be the basis for a practical real-time resource scheduling and resource assignment. Moreover, it is also difficult to obtain accurate predictions for the costs of different requests in a dynamic environment, which are required as input for solving this dynamic resource allocation problem. An additional complication arises in SaaS systems when new customers are being added, as the SaaS system may need to estimate the service-request costs for these new users, even when there is little or no historical or prior information on their usage patterns. As a result, the typical SaaS system cannot simultaneously fulfill the tenant SLA requirements and at the same time maximize the resource sharing capacity.

SUMMARY OF THE INVENTION

The present disclosure describes a system, method and computer program product for maximizing resource sharing capability of a SaaS system.

In one embodiment, there may be provided an apparatus hosting a multi-tenant software-as-a-service (SaaS) system and implementing a method to maximize resource sharing capability of the SaaS system. The apparatus includes a memory device and a processor being connected to the memory device. The apparatus receives service requests from multiple users belonging to different tenants of the multi-tenant SaaS system. The apparatus partitions the resources in the SaaS system into different resource groups. Each resource group handling a category of the service requests. The apparatus estimates costs of the service requests. The apparatus dispatches the service requests to the resource groups according to the estimated costs, whereby the resources are shared, among the users, without impacting each other.

In a further embodiment, to estimate the cost of the service request, the apparatus segments tenants according to tenants' characteristics. The apparatus models a variability of the cost estimation for each segment of the tenants. The apparatus models a variability of the cost estimation for each tenant within each segment. The apparatus models a variability of the cost estimation for each user within each tenant.

In a further embodiment, the apparatus isolates a mutual performance impact between the different tenants.

In a further embodiment, a resource group handles heavy-weight service requests and another resource group handles regular service requests.

BRIEF DESCRIPTION OF THE DRAWINGS

The accompanying drawings are included to provide a further understanding of the present invention, and are incorporated in and constitute a part of this specification.

FIG. 5 illustrates an exemplary scenario where resources are shared in a SaaS system according to one embodiment.

DETAILED DESCRIPTION

Figure 1:
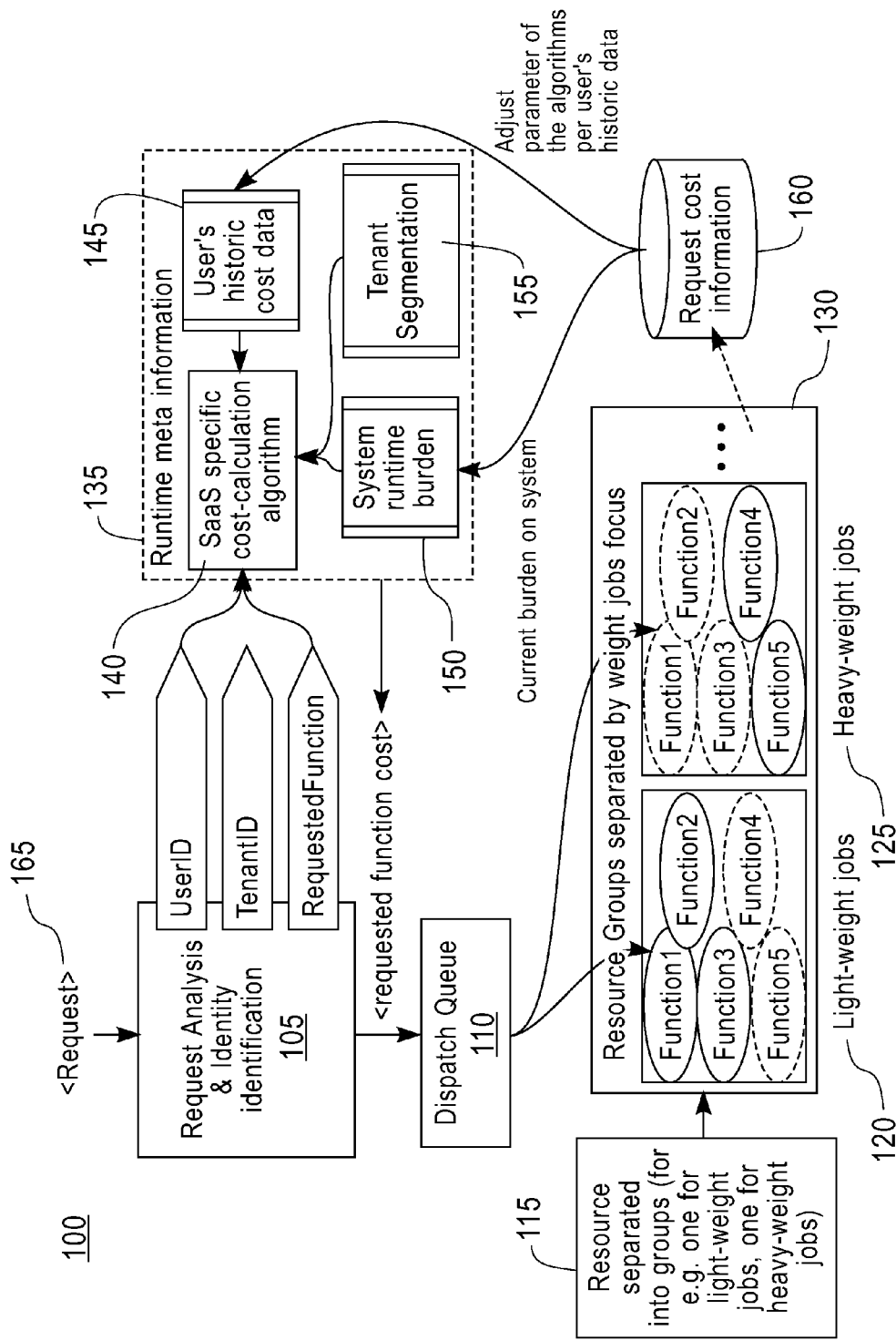
FIG. 1 illustrates an exemplary SaaS system that hosts multiple tenants in one embodiment.

An improvement in the resource sharing capability by multiple tenants enhances the infrastructure utilization, and consequently, decreases the size and cost of an IT service platform (e.g., datacenter). The constraint of performance isolation refers to a requirement that one tenant's service request or overall workload does not adversely impact a service requestor overall workload of another tenant. This performance isolation constraint ensures that the benefits from this improved resource sharing are realized at the overall system level and do not compromise essential performance requirements (e.g., creating and/or storing on-line documents without any visible delay) of individual tenants in the SaaS system.

However, in a multi-tenant SaaS system, there is considerable potential for sharing the resources of the SaaS infrastructure among different tenants. An infrastructure includes, but is not limited to: a set of hardware (e.g., servers or like computing devices), software, storage database, networking, other relevant datacenter resources, and a collection of application services provisioned on these resources. This resource sharing enables a more efficient use of the infrastructure resources with a reduction the costs of an IT service platform (e.g., a datacenter, etc.), which is an objective for SaaS service providers (SPs).

In one embodiment, the computing system provisions several groups of shared resources, where each group corresponds to a different level of the SLA requirements among the tenants. For example, two separate SaaS systems may be provided to two groups of tenants with each group having different SLA specifications.

In one embodiment, there are provided methods (e.g., flow charts in FIGS. 2-4) to maximize a resource sharing capability in a SaaS system (e.g., a system 100 in FIG. 1) for hosting software applications. These methods predict the cost of a service request in the SaaS system, e.g., by using a "context-aware" cost estimation algorithm (i.e., a flow chart in FIG. 4) in which the cost of the service request is obtained by matching a current service request to previous service requests in a same context. A context includes, but is not limited to: system runtime attributes and service request attributes as described in detail below. These methods isolate a mutual performance impact between tenants, e.g., by partitioning resources in the SaaS system into different resource groups based on a category of service requests and letting each resource group exclusively handle a particular category of service requests, in conjunction with a job dispatch function that is aware of these partitioned resource groups. In one embodiment, the SaaS system incorporates a constraint of performance isolation, e.g., by first evaluating a cost of a given service request and then dispatching this request to an appropriate resource group. Since each resource group handles only a particular kind of service request, e.g., one resource group for lightweight jobs (e.g., Instant messaging between users, etc.) and another resource group for heavyweight jobs (e.g., an on-line document collaboration concurrently performed by multiple users, etc.), a heavy service request (i.e., a heavyweight job) from one tenant may not impact regular service requests (i.e., a lightweight job) coming from other tenants. Through performing these methods, an SaaS system achieves performance isolation by assigning a service request from each tenant to an exclusive resource group, and thereby improves an infrastructure resource sharing (e.g., a particular resource group handling all heavyweight jobs from numerous tenants).

This approach (i.e., dividing resources into at least two resource groups, each of which exclusively handles a particular service request) is contrasted with the traditional approach in which all the resources are shared by lightweight as well as heavyweight service requests, since in that case all the service requests are routed to same shared resource, in which case there is a high likelihood of the heavyweight services requests that delay the processing of the lightweight service requests which generally are of a higher priority in terms of a user expectation and tenant SLA requirements in the SaaS system. The SaaS system may determine a specific division of the resources between the lightweight and heavyweight service requests based on an analysis of the tenant SLA requirements, the corresponding historic usage patterns and/or other requirements.

As described briefly above, in order to isolate the performance impact between tenants, the SaaS system separates the resources into groups and each resource group processes service requests allocated to it based on an estimated cost of the service request. A method to estimate a cost of a service request is described in detail below in conjunction with FIG. 4. For example, the SaaS system may consider partitioning of the resources into two groups: a "heavyweight" job processing resource group, and a "lightweight" job processing resource group. The heavyweight job processing resource group may process service requests with a large cost estimate (e.g., a service request that takes longer than 1 hr to process it). The lightweight job processing resource group may process service requests with a small cost estimate (e.g., a service request that takes less than or equal to 1 hr to process it).

Accurate and objective cost estimates for each service request, particularly in a dynamic SaaS system, not only are based on the job-processing requirements (e.g., SLA) provided by the user, but also are augmented or even subsumed, e.g., by an SaaS-specific algorithm (e.g., a flow chart in FIG. 4) for service request cost estimation, which are based on models constructed from historical (i.e., prior) service request cost data from users and tenants as described below. The cost estimation algorithm is capable of providing reliable cost estimates for service requests even when there is little or no historical data for basing this cost estimate, for example, for a new user in the SaaS system.

By partitioning of the resources based on cost estimates of service requests, the SaaS system isolates the performance impact of heavyweight service requests on regular service requests (i.e., lightweight service requests). In other words, heavyweight service requests from one tenant do not impact regular service requests from a different tenant because the heavyweight requests and the regular requests are processed in each different resource group. This partitioning is relevant because it has been empirically observed that SaaS users are more willing to tolerate increases in a wait period for service request completion when they submit a heavyweight service request, but less willing to do so if they submit a regular service request. Users belonging to different tenants may have different cost estimates even though the users requests same/similar service requests corresponding to same/similar functions provided from the SaaS system. Thus, the cost estimation algorithm incorporates a tenant clustering effect (e.g., dividing tenants into premium tenants and trial tenants) into the cost estimation procedure (e.g., method steps 400-430 in FIG. 4), so that a job dispatcher (i.e., a dispatch queue 110 in FIG. 1 that dispatches a service requests according to its estimated cost) can obtain the most accurate estimate when making a dispatching decision for a service request from a specific tenant class. Particular users or individual tenants, depending on their performance requirements (e.g., SLAs), may override the dispatching decision component and enforce a real-time processing of their heavyweight service requests under all circumstances. Such a real-time processing of the heavyweight service requests may provide a flexible business and pricing model for a SP in the SaaS system.

FIG. 1 illustrates an exemplary SaaS system 100 in one embodiment. The SaaS system 100 includes, but is not limited to: a collection of application resources 115 and a service request dispatch component 110, a runtime meta-information component 135, a resource segmentation component 130, a request analysis and identity identification component 105. These components improve the resource sharing capability of the SaaS system while maintaining performance impact isolation between different tenants in a multi-tenant SaaS environment, e.g., by running method steps described in FIGS. 2-4.

After the SaaS system 100 receives a current service request (e.g., a service request 165 in FIG. 1) from a user within a tenant, the request analysis and identity identification component 105 analyzes the current service request to obtain a user ID of the user, a tenant ID of the tenant and a particular function specified in the current service request. A user ID may correspond to a single particular user. A tenant ID may correspond to a group of users who belong to a single tenant. There may a function ID corresponding to each function provided from the SaaS system 100. The request analysis and identity identification component 105 may also collect information (e.g., prior cost estimates of prior service requests) needed to run the cost estimation algorithm, e.g., database or storage device 160 that stores the information.

The request analysis and identity identification component 105 provides the user ID, tenant ID and the specified function to the runtime meta-information component 135. The runtime meta information component 135 includes, but is not limited to: a cost estimation component 140 that estimates a cost of a service request, e.g., by using tenant segmentation information 155 (e.g., premium tenant and trial tenant), system runtime-burden information 150 (i.e., a current workload of the SaaS system 100), and historical cost estimates of prior service requests 145 from the user. The runtime meta-information component 135 may obtain the system runtime-burden information 150 and the historical cost estimates of prior service requests 145, e.g., from the database or storage device 160. The cost estimation component 140 runs an algorithm (e.g., a flow chart illustrated in FIG. 4) to calculate a cost of a service request based on a regression technique using historical usage data (e.g., the historical cost estimates of prior service requests 145). A regression technique includes, but is not limited to: a linear regression, neural net, or any other predictive methodology. Kevin P. Murphy, "Linear regression", March, 2007, wholly incorporated by reference as if set forth herein, describes a linear regression in detail. Christopher M. Bishop, et al., "Neural Networks", ACM Computing Surveys, Vol. 28, No. 1, March, 1996, wholly incorporated by reference as if set forth herein, describes a neural network in detail. The algorithm run by the cost estimation component 140 exploits the historical usage data in the SaaS system based on an observation that different users from a same tenant tend to have similar cost estimates if other factors are held constant. This observation leads to more accurate and suitable cost estimates for users who are newly added to the SaaS system and for whom there is little or no historical usage data.

The resource segmentation component 130 separates the resources 115 (e.g., available software applications in the SaaS system 100) into groups according to their needs and requirement, e.g., if an SP wants to separate service requests as heavyweight service requests 125 and lightweight service requests 120, the resource segmentation component 130 divides the resources 115 into two groups, each of which process the heavyweight service requests 125 or lightweight service requests 120 respectively. Each resource group will then be reserved for processing the service requests within particular cost estimate ranges.

Upon receiving a cost estimate of the current estimate from the cost estimation component 135 and the specified function from the request analysis and identify identification component 105, the dispatch component 110 dispatches to resource segmentation component 130 the current service request according to its cost estimate. The dispatch component 110 may reference a look-up table to find a resource group that is suitable for the current service request and allocates the current service request to the suitable resource group. For example, the dispatch component 110 dispatches a lightweight service request (e.g., a service request that takes less than 1 hr to process) to a lightweight processing resource group (i.e., a resource group processing lightweight service requests) and dispatches a heavyweight service request to a heavyweight processing resource group (i.e., a resource group processing heavyweight service requests).

In one embodiment, the runtime meta-information component 135 includes two subcomponents (not shown): an offline component for building a regression model and an online component for estimating a cost of a service request. A regression model, which is specific to the SaaS system, makes use of service request characteristics, historical usage data and relationship between the users who belong to a same tenant or tenant segment in the SaaS system.

Figure 4:
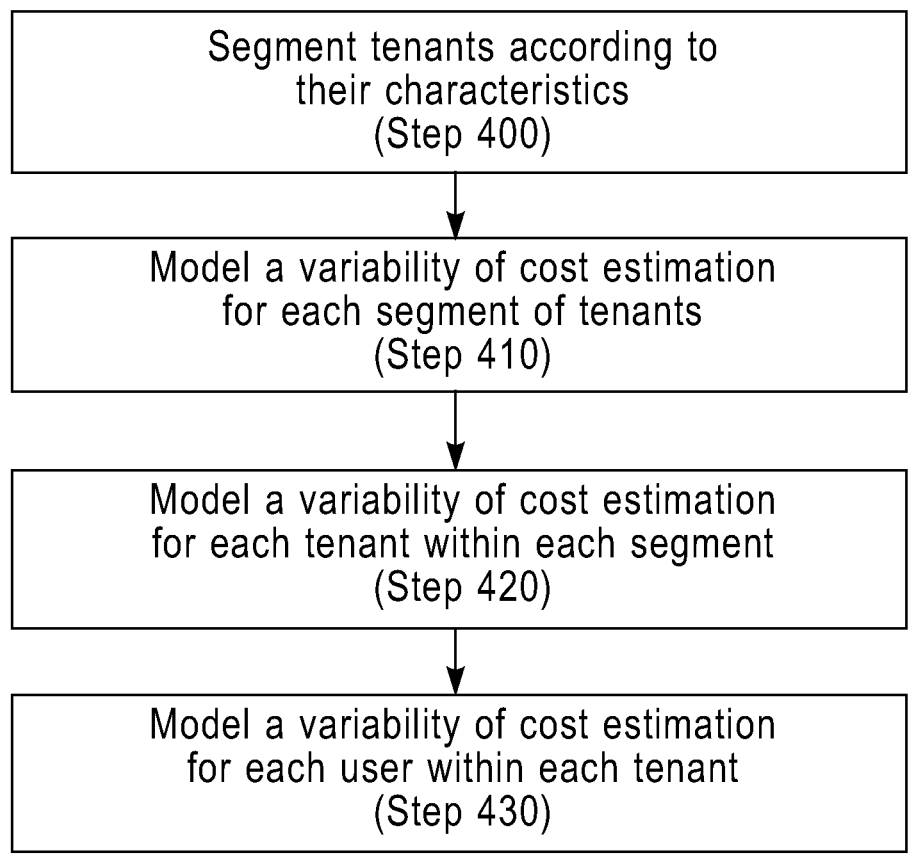
FIG. 4 illustrates a flow chart describing method steps for estimating a cost of a service request in one embodiment.

FIG. 4 illustrates a flow chart describing method steps that the offline component runs in one embodiment. At step 400, the offline component segments tenants according to their characteristics (trial tenants, premium tenants, etc.) and assigns each tenant to a segment. At step 410, for each segment in the tenant segmentation, the offline component models a variability of service request cost estimates across the tenant segments with an appropriate regression formulation, e.g., by using a regression technique (e.g., a linear regression, neural nets, or any other predictive methodology). Variability describes how spread out or closely clustered a set of the cost estimates is. One example of this regression formulation is the following linear regression model with independent and identically distributed, zero-mean, Gaussian errors:

$$\beta_s = \alpha_0 + \alpha_{1^s}(\text{TenantSegment}) + N(0, \sigma_s^2), \text{ for } s = 1, 2, \ldots, S, \quad (1)$$

where $\beta_s$ is a segment-level cost estimate for segment s, TenantSegment is a variable that takes the value 1 for the segment s and is 0 otherwise, S is the total number of segments, and $\alpha_0$, $\alpha_{1^s}$ are estimates of the linear regression model parameters, and $N(0, \sigma_s^2)$ is the zero-mean Gaussian noise with estimated noise variance $\sigma_s^2$.

Returning to FIG. 4, at step 420, for each tenant within each segment, the offline component models a variability of service request cost estimates across the tenants with an appropriate regression formulation, e.g., by using a regression technique (e.g., a linear regression, neural nets, or any other predictive methodology). One example of this regression formulation is the following linear regression model with independent and identically distributed, zero-mean Gaussian errors:

$$\gamma_{ts} = \beta_s + \beta_1(\text{DataVolume}) + N(0, \sigma_t^2), \text{ for } t=1,2,\ldots,T_s, \quad (2)$$

where $\gamma_{ts}$ denotes a service request cost estimate for tenant t in segment s (with $T_s$ being the total number of tenants in segment s), $\beta_s$ is the segment-level cost estimate obtained by the formula (1), which since it is the intercept term in this model, provides the "baseline" cost estimate obtained from the tenant model in (1), and $\beta_1$ are estimates for parameters in the linear regression model, and $N(0, \sigma_t^2)$ is the zero-mean Gaussian noise with estimated noise variance $\sigma_t^2$.

At step 430, for each user within each tenant, the offline component models a variability of service request cost estimates across users in the tenant with an appropriate regression formulation, e.g., by using a regression technique (e.g., a linear regression, neural nets, or any other predictive methodology). One example of this regression formulation that can be used in the SaaS environment is the following linear regression model with independent and identically distributed, zero-mean Gaussian errors:

$$y_{uts} = \gamma_{ts} + \gamma_{1u}(\text{UserFunction}) + \gamma_2(\text{SystemLoad}) + N(0, \sigma_u^2), \text{ for } u=1,2,\ldots,U_{ts} \quad (3)$$

where $y_{uts}$ is a cost estimate for user u for tenant t in segment s, UserFunction is a variable that takes the value 1 for the segment u and is 0 otherwise, $U_{ts}$ is the total number of users for tenant t in segment s, $\gamma_{ts}$ is the tenant and segment-level cost estimate obtained by the formula (2), and $\gamma_{1u}$ and $\gamma_2$ are the estimates for parameters of the linear regression model, and $N(0, \sigma_u^2)$ is the zero-mean Gaussian noise with noise variance $\sigma_u^2$.

The offline component may perform steps 400-430, e.g., by using a hierarchical-model estimation procedure including, without limitation, maximum likelihood estimation and/or Bayesian estimation. In Jae Myung, "Tutorial on maximum likelihood estimation", Journal of Mathematical Psychology, 2003, wholly incorporated by reference as if set forth herein, describes maximum likelihood estimation in detail. Andrew Gelman and Jennifer Hill, "Data Analysis Using Regression and Multilevel/Hierarchical Models", Cambridge University Press, 2006, wholly incorporated by reference as if set forth herein, describes Bayesian estimation in detail.

In one embodiment, the offline component may modify the regression models (e.g., formulas (1)-(3)) in a variety of ways. For example, the offline component may apply the historical usage data on terms in the user model (i.e., formula (3)) and the tenant model (i.e., formula (2)). Similarly, the offline component may apply the historical usage data on other regression coefficients (i.e., modeling parameters) in these models (i.e., formulas (1)-(3)). Further, modeling assumptions can also be modified to handle cases in which error distributions are non-Gaussian. For example, since service request costs may not be negative, and therefore the error distributions may have a skew when the mean of service request costs has a small magnitude (e.g., an average service request cost is 10-minute processing time), whereas the Gaussian distribution which assumes a symmetric distribution of errors may lead to negative service request costs.

An advantage of using the historical usage data in the SaaS system is that the predictions of the regression models (i.e., estimating the formulas (1)-(3)) are weighted by the contributions and the amount of data available in each step in FIG. 4, so that for a user for whom there is a lot of prior cost estimate data available, the predictions of the models are weighted towards an estimation based on the user model (i.e., formula (3)), whereas for a user for whom little prior cost estimate data is available the predictions of the models are weighted towards an estimation based on the tenant model (i.e., formula (2)) and/or the segment model (i.e., formula (1)). These models (i.e., formulas (1)-(3)) may correspond to a hierarchical structure. In this hierarchical structure, the segment model is the top of the hierarchy. The tenant model is the middle of the hierarchy. The user model is the bottom of the hierarchy.

The offline component carries out fitting of these models to the historical usage data to obtain parameter estimates for the models, e.g., by using maximum likelihood method, Bayesian method and/or any other equivalent method. The offline component determines likelihood functions for the models based on historical usage data. A likelihood function used in statistical analyses represents a probability of observed data (e.g., historical usage data) given a model specification (e.g., formulas (1)-(3)). For example, the offline component may denote an overall likelihood function as $L(y_{uts}|\alpha_0, \alpha_{1s}, \beta_1, \gamma_{1u}, \gamma_2, \sigma_s, \sigma_t, \sigma_u)$, which can be equivalently written in the following form $L_u(y_{uts}|\gamma_{ts}, \gamma_{1u}, \gamma_2, \sigma_u) L_t(\gamma_{ts}|\beta_s, \beta_1, \sigma_t) L_s(\beta_s|\alpha_0, \alpha_{1s}, \sigma_s)$, where $L_u(y_{uts}|\gamma_{ts}, \gamma_{1u}, \gamma_2, \sigma_u)$, $L_t(\gamma_{ts}|\beta_s, \beta_1, \sigma_t)$ and $L_s(\beta_s|\alpha_0, \alpha_{1s}, \sigma_s)$ denote the likelihood functions for the segment model, tenant model and user model respectively. The offline component may carry out estimation of the parameters $(\alpha_0, \alpha_{1s}, \beta_1, \gamma_{1u}, \gamma_2, \sigma_s, \sigma_t, \sigma_u)$, e.g., by using the maximum likelihood estimation and/or Bayesian estimation as described in the references cited above. These estimation methods may also be used to generate the cost estimate $\gamma_{uts}$ for future service requests in the online component.

The online component in the runtime meta information component 135 performs one or more of: (1) obtaining the user ID, the tenant ID, and the function ID for the service request, e.g., by communicating with the request analysis and identity identification component 105; (2) finding a tenant segment ID (i.e., an ID for a corresponding tenant segment) and obtaining the other parameters such as the historical usage data 145 and system runtime-burden information 150, e.g., from the database or storage device 160, which are used as inputs to the regression models (i.e., $\gamma_2$ in formula (3)) that is computed in the offline component described above; (3) obtaining an estimate of service request cost, e.g., using the regression models (i.e., formulas (1)-(3)) described above. System run-time burden information includes, but is not limited to: processor cycles measured by the number of clock cycles, system operation time measured by standard time unit, memory usage measured by the amount of usage space in the memory, the throughput of the system, etc.

Figure 2:
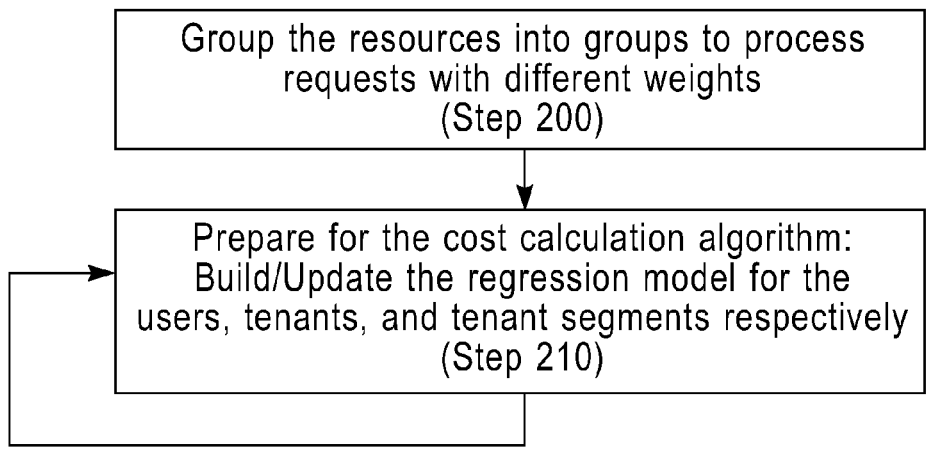
FIG. 2 illustrates a flow chart describing method steps for maximizing resource sharing capability in a SaaS system in one embodiment.

FIG. 2 illustrates, in further detail, method steps performed by the offline component in the SaaS system. At step 200, a system administrator or operator separates the resources 115 into groups as per business needs. Each resource group processes service requests with a pre-specified weight (e.g., lightweight service request or heavyweight service request) based on the cost estimates of service requests. At step 210, these service request cost estimates are obtained from algorithms (e.g., a flow chart illustrated in FIG. 4) using the regression models based on the historical usage data for prior service requests. This historical usage data may be available with several fields to provide a context (e.g., inputs) for the regression models (e.g., the user model, the tenant model, and/or the segment model). An example of the historical usage data includes, but is not limited to: "Service Record: user A in tenant 1 cost 100 on function F1 using resource R with system load percent S." The offline component may compute and/or update the regression models as often as needed in order to incorporate the latest historical usage data and status from SaaS system service records (i.e., records that describes prior services provided by the SaaS system).

Figure 3:
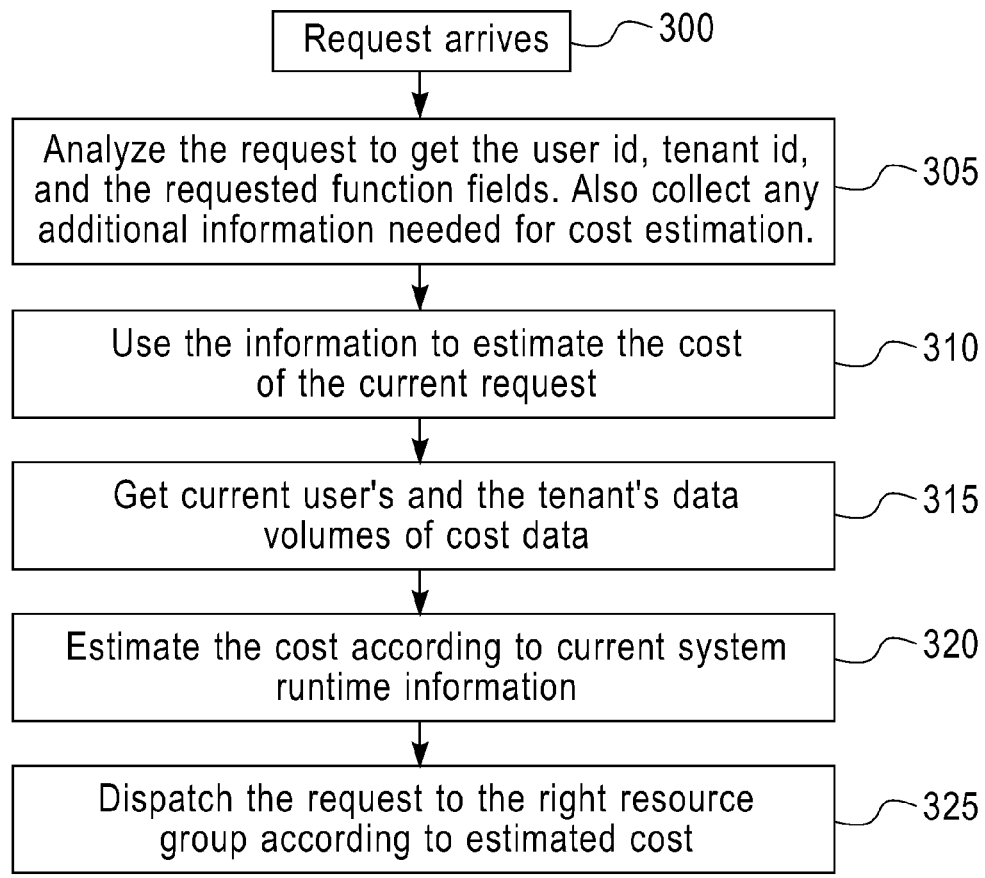
FIG. 3 illustrates a flow chart describing method steps for maximizing resource sharing capability in a SaaS system in another embodiment.

FIG. 3 illustrates a flow chart that describes method steps performed by the SaaS system 100 in one embodiment. The method steps in FIG. 3 may be performed before or after the method steps in FIG. 2. The SaaS system 100 may perform the method steps in FIG. 3 concurrently with the method steps in FIG. 2. At step 300, the SaaS system receives a service request (e.g., a request that creates an on-line collaboration document) from a user in a tenant using the SaaS system 100. At step 305, the request analysis and identity identification component 105 obtains the user ID, the tenant ID (corresponding to the user) and the corresponding function ID for the service request, e.g., by analyzing the service request. The component 105 may also collect additional information (e.g., how fast the service request needs to be processed) necessary for the cost estimation of the service request. At step 310, the offline component in the runtime meta information component 135 runs an algorithm (e.g., a flow chart illustrated in FIG. 4) to estimate the cost of the service request, e.g., by using the information obtained and collected in the online component in the component 135. For example, the offline component uses the tenant segment information (e.g., tenant ID) to formulate the formula (1) as described above. At step 315, the component 135 collects historical usage data of the user and/or the tenant. At step 320, the component 135 updates the cost estimate of the service request based on the historical usage data and/or current system runtime-burden information. For example, the offline component uses the historical usage data ("DataVolume") in the formula (2) and the system run-time burden ("SystemLoad") in the formula (3) to update the cost estimate of the service request. At step 325, using the updated cost estimate, the dispatch component 110 checks metadata (e.g., a look-up table) to find a resource group that is best suited to process the service request given its cost estimate, and then dispatches the service request to the found resource group.

Following describes an exemplary usage scenario of the invention in one embodiment. The exemplary scenario concerns an Enterprise Resource Planning (ERP) service, which is a software applications package used by small and medium business (SMB) customers and delivered as a software service via the Internet. This service has already acquired several hundreds of tenants, and currently includes paying customers as well as trial customers.

At a beginning of each operational phase of the service, the service uses a simple policy to provide the necessary resource sharing capability. Taking into account the different customer SLA requirements for the paying and trial users and in order to ensure the performance isolation among tenants, an SP of the service uses two separate resource sets in order to serve each user group for each level of SLA requirements (i.e., a resource set for a trial user group and another resource set for a paying user group). An operation management system is responsible for dispatching service requests from same SLA level customers to an appropriate resource set of a SaaS system. Although the use of two resource groups is helpful from the resource utilization perspective, these resources cannot be shared, for example, in a case when one resource group is busy while the other resource is unutilized. Second, the performance isolation constraint between tenants cannot be satisfied, since although the use of the two resource groups provides performance isolation between the respective resource groups, however, the performance isolation is not obtained for different tenants in a resource group.

The SaaS system 100 maximizes resource sharing capability in the system 100, e.g., by partitioning resources and processing a service request in a resource partition exclusively according to a cost estimation of the service request. In order to achieve the performance impact isolation, the resources are separated into groups and each group will process request with a different cost estimate range. When a service request comes to the SaaS system, a cost of the service request is estimated by the runtime meta-information component 135. The service request is dispatched to an appropriate resource group based on the cost estimate of the requested service. As a result, the heavyweight service requests 125 do not impact the throughput of the lightweight service requests 120. In addition, taking into consideration of the cost estimation algorithm (i.e., illustrated in FIG. 4) that uses historical usage data, tenant segmentation and system runtime-burden information as inputs, the service request can be dispatched more accurately to an appropriate resource group to ensure a correct resource usage. Therefore, the heavyweight service requests from a tenant do not impact regular service requests from every other tenant. For example, the use of this SaaS system 100, as described below, leads to a 30% improvement on the performance isolation impact.

FIG. 5 illustrates a simulation assumption table 500 that describes various assumptions made to evaluate a performance of the SaaS system 100 as compared to a traditional SaaS system. As illustrated in the table 500, assume that there are 10 paid tenants (560) and 20 trial tenants (550). Further assume that there are 5 heavyweight service requests, concurrently 40 regular service requests from the paid tenants (560) and 160 other non-impacted regular service requests from the paid tenants (560). On the other hand, assume that there are 4 heavyweight service requests and 60 regular job requests in the same time period from the trial tenants (550) and 100 other non-impacted regular jobs from the trial tenants (550). It is further assumed that every 100 regular service requests will lead to a 20% resource cost increase, while every heavy-weight job request will lead to a 10% resource cost increase.

The performance impact ratio for this scenario can be obtained as follows:
1) Under the traditional SaaS system
The impact ratio on the paid tenants is (Number of impacted regular jobs)/(Total number of jobs)=40/205=20%. The impact ratio on the trial tenants is (Number of impacted ordinary jobs)/(Total number of jobs)=60/164=36%. Then, the total impact ratio is (Impact ratio in Trial system)*(trial tenants number/total tenants number)+(Impact ratio in Paid system)*(Paid tenants number/total tenants number)= 20%*1/3+36*2/3=30.67%.
2) Under the SaaS system 100 in one embodiment:
The impact ratio is affected only on the heavyweight service requests. Since individual tenants will tend to be more patient for the heavyweight service requests, the impact ratio on the heavyweight service requests is very low from the perspective of the impacted service requests: Impacted jobs/total jobs number=(5+4)/369=2.4%. The performance isolation improvement under the SaaS system 100 is therefore 30.67%−2.4%=28.27%.
Since there are no proprietary resources for tenants, each resource can be provisioned by all the tenants. This exemplary usage scenario result demonstrates that a system utilization of an SaaS environment can be considerably improved by adopting the SaaS 100.

Figure 6:
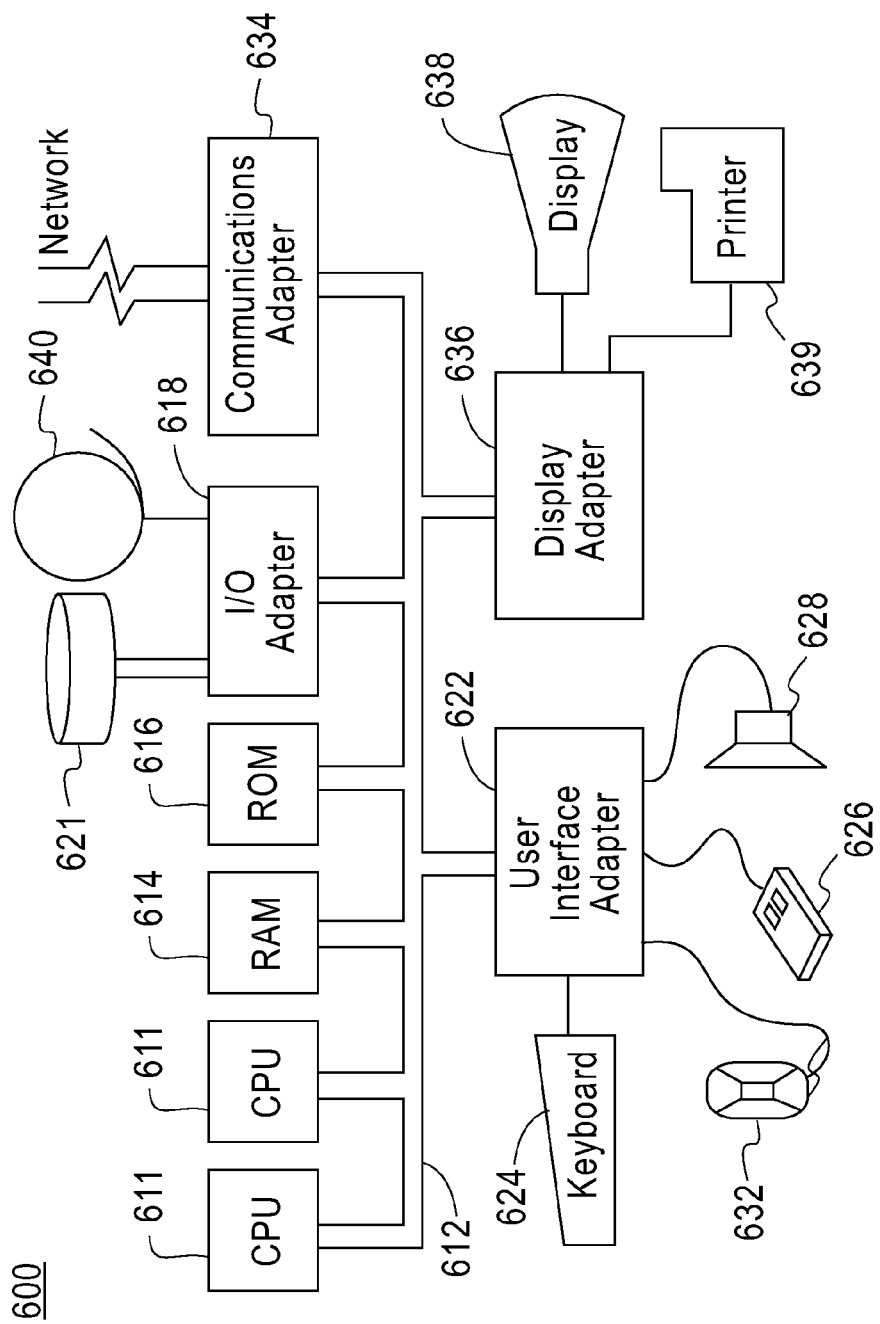
FIG. 6 illustrates an exemplary hardware configuration to implement the method steps described in FIGS. 2-4 in one embodiment.

FIG. 6 illustrates an exemplary hardware configuration of a computing system 600 running and/or implementing the method steps in FIGS. 2-4. The hardware configuration preferably has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting the system 600 to a data processing network, the Internet, an Intranet, a local area network (LAN), etc., and a display adapter 636 for connecting the bus 612 to a display device 638 and/or printer 639 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for real-time sharing of resources in a multi-tenant software-as-a-service (SaaS) system, the method comprising:
receiving service requests from multiple users belonging to different tenants of the multi-tenant SaaS system;

partitioning the resources in the SaaS system into different resource groups, each resource group handling a category of the service requests;

estimating costs of the service requests by using a tenant segmentation variable, a segment representing a group of tenants, a tenant representing a group of users, a first multiplication of the tenant segmentation variable and a first regression parameter estimate, a second multiplication of a current workload of the multi-tenant SaaS system and a second regression parameter estimate, an addition of a result of the first multiplication and a result of the second multiplication, and historical cost estimates of prior service requests from each of the users; and dispatching the service requests to the resource groups according to the estimated costs, whereby the resources are shared, among the users, without impacting each other.

2. The method according to claim 1, further comprising:
analyzing the service requests to acquire user IDs of the users, tenant IDs of the tenants, and requested functions of the service requests.

3. The method according to claim 1, further comprising: isolating a mutual performance impact between the different tenants.

4. The method according to claim 3, wherein a resource group handles first-type service requests and another resource group handles second-type service requests, the first-type service requests taking longer than a pre-determined time period in order to process the first-type service requests, the second-type service requests taking less than or equal to the pre-determined time period in order to process the second-type service requests.

5. The method according to claim 3, wherein the estimation includes steps of:
segmenting tenants according to tenants' characteristics;
modeling a variability of the cost estimation for each segment of the tenants;
modeling a variability of the cost estimation for each tenant within each segment; and
modeling a variability of the cost estimation for each user within each tenant.

6. The method according to claim 5, wherein the modelings include at least one regression technique.

7. The method according to claim 6, further comprising:
using a modeling based on the regression technique with model parameters obtained by maximum likelihood estimation or Bayesian estimation methods.

8. The method according to claim 1, wherein each resource group processes the service requests within a particular cost estimate ranges.

9. An apparatus hosting a multi-tenant software-as-a-service (SaaS) system to maximize resource sharing capability of the SaaS system, the apparatus comprising:
a memory device; and
a processor being connected to the memory device, wherein the processor performs steps of:
receiving service requests from multiple users belonging to different tenants of the multi-tenant SaaS system;
partitioning resources in the SaaS system into different resource groups, each resource group handling a category of the service requests;
estimating costs of the service requests by using a tenant segmentation variable, a segment representing a group of tenants, a tenant representing a group of users, a first multiplication of the tenant segmentation variable and a first regression parameter estimate, a second multiplication of a current workload of the multi-tenant SaaS system and a second regression parameter estimate, an addition of a result of the first multiplication and a result of the second multiplication, and historical cost estimates of prior service requests from each of the users; and dispatching the service requests to the resource groups according to the estimated costs, whereby the resources are shared, among the users, without impacting each other.

10. The apparatus according to claim 9, wherein the processor further performs a step of:
analyzing the service requests to acquire user IDs of the users, tenant IDs of the tenants, and requested functions of the service requests.

11. The apparatus according to claim 9, wherein the processor further performs a step of:
isolating a mutual-performance impact between the different tenants.

12. The apparatus according to claim 11, wherein a resource group handles first-type service requests and another resource group handles second-type service requests, the first-type service requests taking longer than a pre-determined time period in order to process the first-type service requests, the second-type service requests taking less than or equal to the pre-determined time period in order to process the second-type service requests.

13. The apparatus according to claim 9, wherein the estimation includes steps of:
segmenting tenants according to tenants' characteristics;
modeling a variability of the cost estimation for each segment of the tenants;
modeling a variability of the cost estimation for each tenant within each segment;
modeling a variability of the cost estimation for each user within each tenant.

14. The apparatus according to claim 13, wherein the modelings include at least one regression technique.

15. The apparatus according to claim 14, wherein the processor further performs a step of:
using a modeling based on the regression technique with model parameters obtained by maximum likelihood estimation or Bayesian estimation methods.

16. A computer program product for sharing resources in a multi-tenant software-as-a-service (SaaS) system, the computer program product comprising a storage medium readable by a processing circuit, the storage medium excluding only a propagating signal and storing instructions run by the processing circuit for performing a method, the method comprising:
receiving service requests from multiple users belonging to different tenants of the multi-tenant SaaS system;
partitioning resources in the SaaS system into different resource groups, each resource group handling a category of the service requests;
estimating costs of the service requests by using a tenant segmentation variable, a segment representing a group of tenants, a tenant representing a group of users, a first multiplication of the tenant segmentation variable and a first regression parameter estimate, a second multiplication of a current workload of the multi-tenant SaaS system and a second regression parameter estimate, an addition of a result of the first multiplication and a result of the second multiplication, and historical cost estimates of prior service requests from each of the users; and dispatching the service requests to the resource groups according to the estimated costs, whereby the resources are shared, among the users, without impacting each other.

17. The computer program product according to claim 16, wherein the method further comprises:
analyzing the service requests to acquire user IDs of the users, tenant IDs of the tenants, and requested functions of the service requests.

18. The computer program product according to claim 16, wherein the method further comprise:
isolating a mutual performance impact the different tenants.

19. The computer program product according to claim 18, wherein a resource group handles first-type service requests and another resource group handles second-type service requests, the first-type service requests taking longer than a pre-determined time period in order to process the first-type service requests, the second-type service requests taking less than or equal to the pre-determined time period in order to process the second-type service requests.

20. The computer program product according to claim 18, wherein the estimation includes steps of:
segmenting tenants according to tenants' characteristics;
modeling a variability of the cost estimation for each segment of the tenants;
modeling a variability of the cost estimation for each tenant within each segment; and
modeling a variability of the cost estimation for each user within each tenant.

21. The computer program product according to claim 20, wherein the modelings include at least one regression technique.

22. The computer program product according to claim 21, wherein the method further comprises:
using a modeling based on the regression technique with model parameters obtained by maximum likelihood estimation or Bayesian estimation methods.

\* \* \* \* \*